United States Patent [19]

Fujioka et al.

[11] Patent Number: 4,928,052
[45] Date of Patent: May 22, 1990

[54] POWER SUPPLY REGENERATING CIRCUIT

[75] Inventors: Yoshiki Fujioka, Yamanashi; Mitsuhiko Hirota, Tokyo, both of Japan

[73] Assignee: Fanuc Ltd., Minamitsuru, Japan

[21] Appl. No.: 274,148

[22] PCT Filed: Apr. 27, 1988

[86] PCT No.: PCT/JP88/00417
§ 371 Date: Nov. 9, 1988
§ 102(e) Date: Nov. 9, 1988

[87] PCT Pub. No.: WO88/08639
PCT Pub. Date: Nov. 3, 1988

[30] Foreign Application Priority Data

Apr. 30, 1987 [JP] Japan ................................. 62-107255
Apr. 30, 1987 [JP] Japan ................................. 62-107258
Apr. 30, 1987 [JP] Japan ................................. 62-107259

[51] Int. Cl.$^5$ ............................................. H02P 3/18
[52] U.S. Cl. ........................................ 318/762; 318/759
[58] Field of Search .................................. 318/757-762

[56] References Cited

U.S. PATENT DOCUMENTS

| | | | |
|---|---|---|---|
| 4,230,979 | 10/1980 | Espelage et al. | 318/759 |
| 4,319,177 | 3/1982 | Kawada et al. | 318/798 |
| 4,434,393 | 2/1984 | Kobari et al. | 318/762 |
| 4,521,724 | 6/1985 | Sakamoto et al. | 318/762 |

Primary Examiner—David Smith, Jr.
Attorney, Agent, or Firm—Staas & Halsey

[57] ABSTRACT

A power supply regenerating circuit according to the present invention is used in an inductor motor drive circuit which performs motor drive control and regenerative control. The induction motor drive circuit has a parallel circuit including a reverse connected diode (D10) and a resistor (R1) connected between a circuit (C2), which rectifies and then smoothes the induced electromotive force of an induction motor (M) during deceleration, and a bridge circuit (Tr1-Tr6) which effects a conversion into AC power. Regenerative power blocked by the diode (D10) is supplied to the bridge circuit (Tr1-Tr6) as a current limited by the resistor (R1), and the regenerative power is regenerated only during a predetermined interval of a three-phase period.

5 Claims, 6 Drawing Sheets

POWER SUPPLY REGENERATING CIRCUIT

BACKGROUND OF THE INVENTION

1. Field of the Invention

This invention relates to a power supply regenerating circuit in an induction motor drive circuit which performs drive control and regenerative control.

2. Description of Related Art

There are cases in which an induction motor is repeatedly accelerated and decelerated due to the characteristic of a driven load, at which time the load torque varies positively and negatively.

Though various control means are used in order to process the rotational energy at the time of deceleration, a regenerative control circuit is widely employed. The regenerative control circuit converts the rotational energy into power by electrical braking means and transmits the power to the power supply on the motor side.

Figure 7:
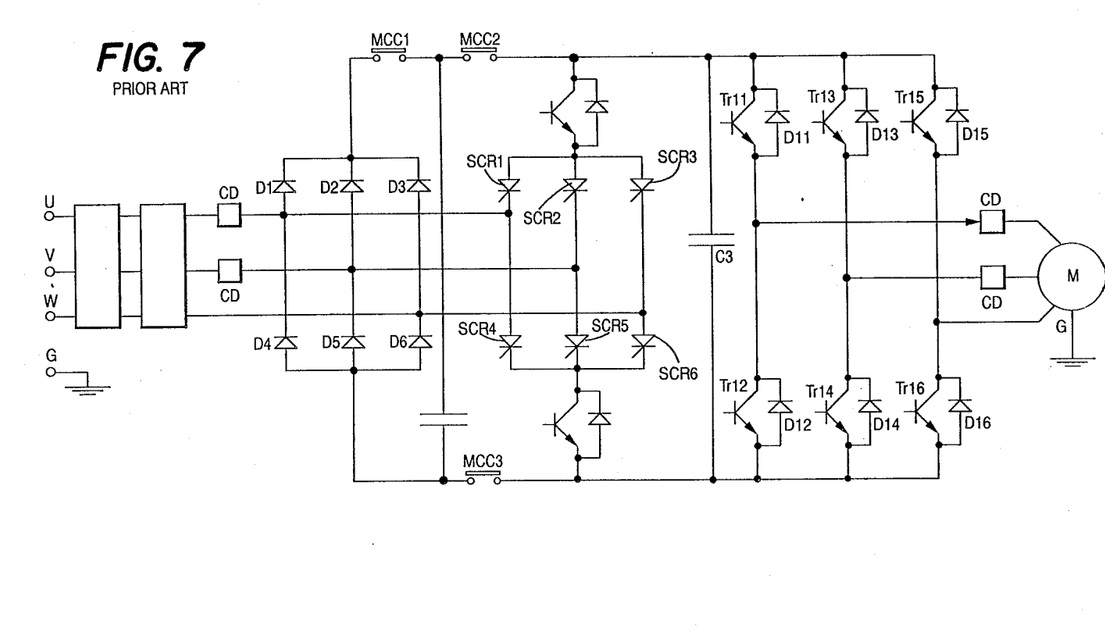
FIG. 7 is a circuit diagram of a prior art regenerative control circuit.

FIG. 7 is a circuit diagram of a regenerative control circuit of this type. When an induction motor is driven, three-phase power is converted into a direct current and the power is supplied to the induction motor as a predetermined AC power by an inverter. At the time of power regeneration, the power from the AC motor is rectified. It is then converted into AC power by the regenerative control circuit, which is composed of transistors and a thyristor bridge, to carry out power regeneration.

In FIG. 7, a three-phase full-wave rectifier is formed by diodes D1–D6. Power that has been converted into direct current is supplied to a transistor inverter, which is composed of transistors Tr11–Tr16, via a smoothing circuit of a capacitor C3. In response to a command signal from a control circuit (not shown). Voltage and frequency are controlled and the AC power resulting from the conversion is supplied to an induction motor M, whereby the motor is run at a predetermined rotational velocity.

When regenerative control is performed, MCC1–MCC3 are turned off, the induced voltage of the induction motor M produced at deceleration is converted into direct current by a three-phase rectifier circuit composed of diodes D11–D16. The direct current is converted into AC power having the same frequency as the supplied power by the regenerative control circuit, which comprises a thyristor bridge SCR1–SCR6, via the smoothing circuit of the capacitor C3. This AC power is then regenerated in the power supply, thus achieving regenerative control.

In the regenerative control circuit of the above-described type, the induced power of the induction motor is converted into direct current and made smooth. Consequently, a large circuit flows into the thyristor bridge SCR1–SCR6 at onetime during the AC regeneration period. A PWM control circuit, for example, is used as a complicated control circuit to limit this current.

Furthermore, the control signal, when DC power is converted into AC power at the time of the regenerative operation, performs a frequency setting operation by a manual changeover. However, if the set frequency and the power supply frequency differ, an abnormal current flows and, hence, there is the danger that the transistor bridge will burn out.

SUMMARY OF THE INVENTION

The present invention has been devised in order to solve the aforementioned problems and its object is to provide a power supply regenerating circuit adapted to perform current limiting by connecting a resistor and a diode to a circuit which rectifies induced electromotive force from an induction motor at deceleration and converts the rectified electromotive force into AC power by a bridge circuit to regenerate the power supply.

Another object of the present invention is to provide a power supply frequency discriminating circuit in a power supply regenerating circuit for automatically discriminating the AC frequency of supplied power and controlling the AC frequency of regenerating power to a frequency the same as that of the power supply.

In accordance with the present invention, there is provided a power supply regenerating circuit for driving an induction motor upon controllig AC frequency and voltage by an inverter after three-phase power is rectified and made smooth. The power supply regenerating circuit also rectifies and smooths induced electromotive force during deceleration of the induction motor and effects a conversion into AC power by a semiconductor bridge circuit to perform power supply regeneration. A parallel circuit composed of reverse connected diode and a resistor is inserted between the circuit which performs rectifying and smoothing at power supply regeneration and the semiconductor bridge circuit.

Thus, with the power supply regenerating circuit of the present invention, a parallel circuit composed of a reverse connected diode and a resistor is inserted between the circuit which rectifies and smoothes the electromotive force from the induction motor during deceleration and the bridge circuit which makes the conversion into AC power. Therefore, in order to perform power regeneration during deceleration, the current from the smoothing circuit to the bridge circuit is blocked by the diode and the current limited by the resistor is supplied to the bridge circuit. At the time of the induction motor drive operation, the circuit acts to supply a sufficient current since the diode is forward biased. The regenerative power is regenerated in the power supply only for a predetermined term of the three-phase period. As a result, the capability of power regeneration from the induction motor is enhanced and excellent regenerative braking efficiency is obtained.

Further, in accordance with the present invention, there is provided a power supply frequency discriminating circuit in a power supply regenerating circuit, comprising synchronizing signal generating means for generating signals upon successively detecting points at which an instantaneous value of voltage in one phase of a three-phase power supply and an instantaneous value of voltage in the next phase become equal. In addition clock generating means for generating clock pulses, counting means for counting clock pulses between signals from the synchronizing signal generating means, discriminating means for discriminating 50 Hz/60 Hz in dependence upon a counted value in the counting means, and control means for controlling the AC converter circuit by a signal from the discriminating means are provided. More specifically, a synchronizing signal corresponding to the frequency of the power supply is generated, and clock pulses present during the period of the synchronizing signal are counted by counting means. Next, the counted value is compared with a present reference value, and the frequency of the regenerative power is controlled upon discriminating 50 Hz or 60 Hz based on the results of the comparison. In this way the discrimination of power supply frequency can be performed accurately and automatically and it is possible to prevent accidents due to erroneously setting a frequency at power regeneration of the induction motor.

DESCRIPTION OF THE PREFERRED EMBODIMENTS

Embodiments of the present invention will now be described in detail with reference to the drawings.

Figure 1:
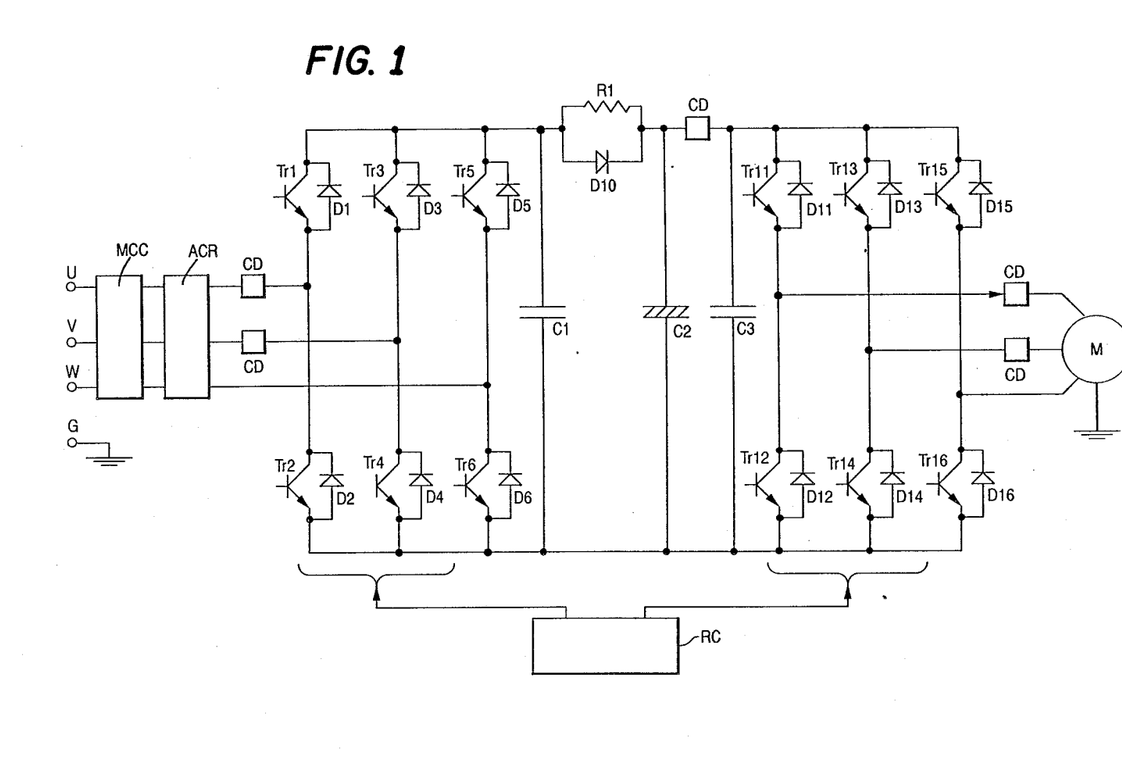
FIG. 1 is a circuit diagram of a first embodiment according to the present invention.

FIG. 1 is a circuit diagram of a first embodiment according to the present invention. In FIG. 1, MCC denotes a circuit switch and ACR denotes a reactor. These are connected to a bridge circuit for controlling the on/off operation of transistors Tr1-Tr6 having respective diodes D1-D6 connected in parallel therewith. During drive of an induction motor M, electric power from a three-phase AC power supply U, V, W is supplied to the diodes D1-D6 to be rectified and converted into a direct current. During power regeneration of the induction motor M, the circuit acts as a energizing circuit for regenerating the output, which controlled in an on-off manner by the transistors Tr1-Tr6, in the power supply.

Transistors Tr11-Tr16 form an inverter circuit for converting DC power from a smoothing capacitor C2 into AC power during the time the motor is driven. The circuit is so arranged so that the voltage and frequency of the AC output are controlled by a control signal from a controller RC. Thus, the rotational speed and torque of the induction motor M are controlled. Diodes D11-D16 are connected in parallel with respective ones of the transistors Tr11-Tr16 serve as flyback diodes which rectify the electromotive force of the induction motor M during deceleration and transmit the rectified electromotive force to the smoothing capacitor C2.

A resistor R1 and a diode D10 are connected to the bridge circuit (the rectifier circuit of D1-D6) which is on/off controlled by the smoothing capacitor C2 and the transistors Tr1-Tr6. The conducting direction of the diode D10 is such that a current flows into the inverter circuit of the transistors Tr11-Tr16 from the rectifier circuit of the diodes D1-D6 during the time the motor is driven.

Figure 2:
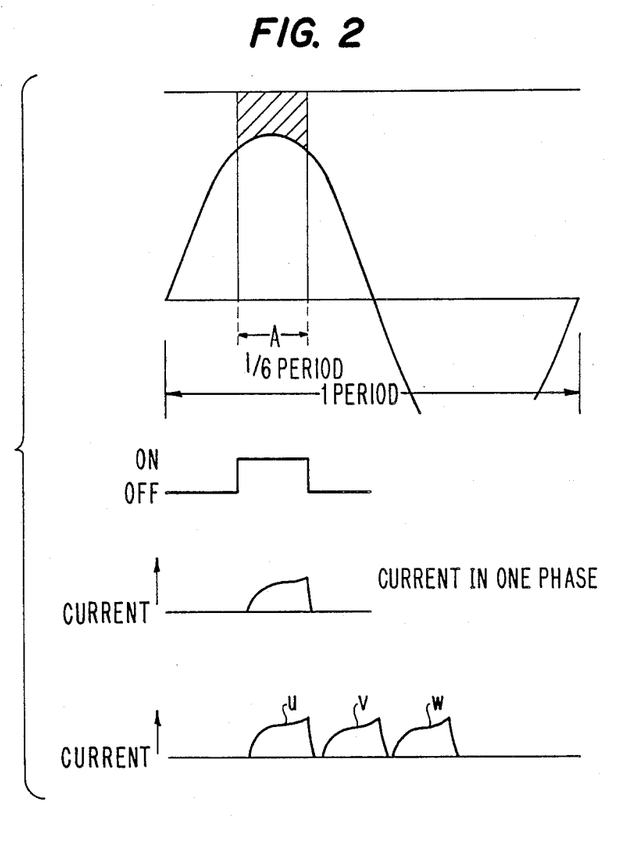
FIG. 2 is a waveform diagram describing regenerative operation of the embodiment in FIG. 1.

As shown in FIG. 2, the bridge circuit Tr1-Tr6 is turned on for a time A, which is 1/6 the AC period, thereby passing a regenerative current in the direction of the power supply. In FIG. 2, u, v and w indicate currents which flow during the ON intervals of the three phases.

CD shown in FIG. 1 denotes a current detector adapted so as to transmit the respective detected current signals to the controller RC.

At the time the induction motor drive in this embodiment is constructed, a pulsating current full-wave rectified by the diodes D1-D6 is fed to the smoothing capacitor C2 via the diode D10. AC power of a predetermined voltage and frequency is transmitted to the induction motor M by the inverter circuit including transistors Tr11-Tr16 supplied with a smooth direct current. As a result, the motor runs.

When the induction motor M attains a decelerated state and performs a generating operation in response to the state of the load, the induced electromotive force is full-wave rectified by the diodes D11-D16 and then transmitted to the smoothing capacitor.

As for the smoothed DC power, the current limited by the resistor R1 is supplied to the bridge circuit of transistors Tr1-Tr6 since the diode D10 is reverse connected. Since this bridge circuit is turned on and passes current during the inverval A in FIG. 2 in response to the control signal from the controller RC, the u, v and w currents are regenerated in the power supply via the resistor R1.

The resistance value of resistor R1 is set to a value which will prevent an excessive current from flowing into each of the transistors Tr1-Tr6 during regenerative operation. As a result, little heat is produced by the resistor R1. Further, since the current which flows into the bridge circuit is limited by the resistor, power regeneration can be achieved merely by simple on/off control without requiring a complicated limiting circuit such as a PWM controller, by way of example. Consequently, the load on the transistors is alleviated and the amount of heat produced is also reduced.

Next, reference will be had to the drawings to give a detailed description of an embodiment of a power supply frequency discriminating circuit for automatically discriminating the AC frequency of a power supply and regenerating electric power in an induction motor drive circuit having a power supply regenerating circuit of the type set forth above.

Figure 3:
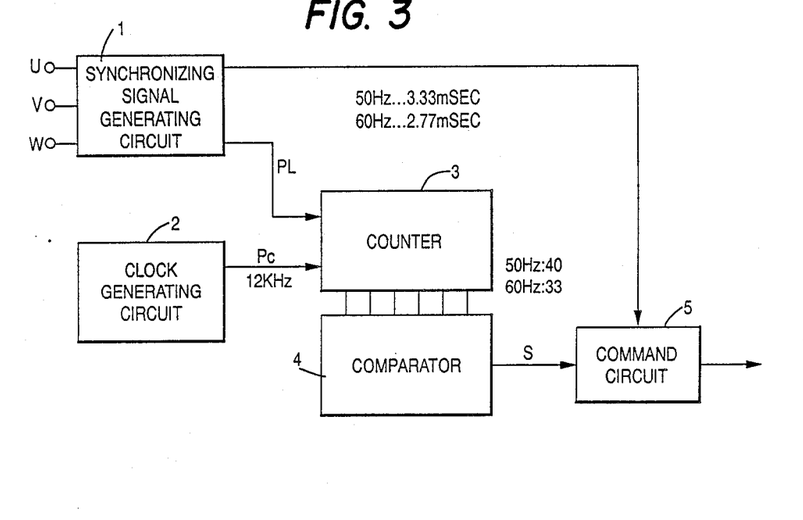
FIG. 3 is a block diagram of an embodiment of a power supply frequency discriminating circuit of a power supply regenerating circuit.
Figure 4:
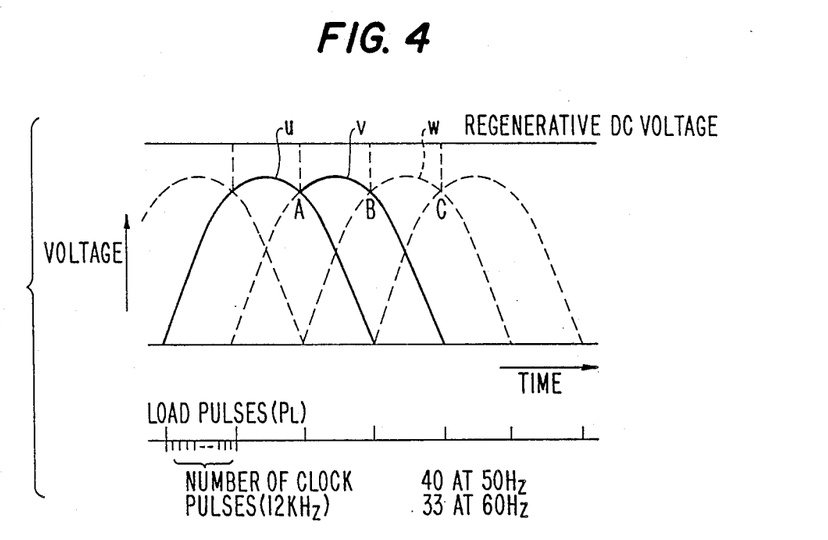
FIG. 4 is a waveform diagram describing the operation of the embodiment in FIG. 4.

In a power supply frequency discriminating circuit shown in FIG. 3, numeral 1 denotes a synchronizing signal generating circuit to which voltage signals are input from three power supply phases U, V and W. This circuit detects cross points A, B, C at which voltage values of mutually adjacent ones of the u, v and w phases shown in FIG. 4 become equal, generates a synchronizing signal in the form of a load pulse PL at each cross point and supplies these signals to a counter 3. It should be noted that detection of the cross points can be performed using, for example a diode and a photocoupler.

Numeral 2 denotes a clock generating circuit for generating a 12 KHz pulse signal Pc as a clock pulse. This pulse signal is delivered to the counter 3. The counter 3, to which the pulse signal Pc and load pulses Pl are applied as inputs, counts the pulse signal Pc during one period of the load pulses PL.

When the length of time of one period of the load pulses PL is computed, we have 1 sec/50/6=3.33 msec for 50 Hz and $$1 \text{ sec}/60/6 = 2.77 \text{ msec}$$

for 60 Hz since the cross point interval is equivalent to 1/6 of one cycle of the three-phase alternating current. Next, computing the number of clock pulses in each of these time periods, we have $$3.33 \text{ msec}/(1/12000) = 40$$

for 50 Hz and $$2.77 \text{ msec}/(1/12000) = 33$$

for 60 Hz. The number of clock pulses is 40 in one period of the 50 Hz load pulses PL and 33 in one period of the 60 Hz load pulses. Accordingly, in order to distinguish between 50 Hz and 60 Hz, the intermediate value 36, by way of example, is set as a reference number of pulses. This facilitates frequency discrimination, which will depend upon whether the input number of pulses is greater than or less than 36.

Returning to FIG. 3, there is shown a comparator at 4 for comparing the reference pulse number, e.g., 36, with the number of pulses in the pulse signal Pc counted by the counter 3, and for sending a discriminating signal S to a command circuit 5. A "0" discrimination signal is transmitted when the count in counter 3 is less than the reference pulse number, and a "1" discrimination signal is transmitted when the count in counter 3 is greater than the reference pulse number. The command circuit issues a 50 Hz command when the discrimination signal is "0" and a 60 Hz command when the discrimination signal is "1". The arrangement is such that the command is applied to, for example, the semiconductor bridge circuit Tr1-Tr6, which forms the inverter shown in FIG. 1, to control the frequency of regenerative power.

During the time the induction motor M is driven, the inverting semiconductor bridge circuit Tr1-Tr6, having the respective diodes D1-D6 connected in parallel therewith, full-wave rectifies the power from the three-phase power supplies U, V, W and applies the result to the smoothing capacitor C2 via the diode D10. During power regeneration, the semiconductor bridge circuit takes the DC power supplied via the limiting resistor R1 and regenerates 50 Hz or 60 Hz AC power in the power supply by the transistors Tr1-Tr6.

The inverter circuit Tr11-Tr16 for driving the induction motor M upon receiving the power from the smoothing capacitor C2 forms a full-wave rectifier circuit for rectifying induced electromotive force by the diodes D11-D16 during deceleration of the induction motor M and for transmitting the result to the smoothing capacitor C2. The controller RC, which is equipped with the power supply frequently discriminating circuit shown in FIG. 3, sends a command to the semiconductor bridge circuit Tr1-Tr6 and sends a command to the inverter Tr11-Tr16 that will operate the induction motor M efficiently.

In the embodiment thus constructed, the electromotive force from the induction motor M at the time of power regeneration is full-wave rectified by the rectifier circuit D11-D16. The full wave-rectified electromotive force is then transmitted to the semiconductor bridge circuit Tr1-Tr6 through the limiting resistor R1.

In response to the signal from the controller RC having the power supply frequency discriminating circuit shown in FIG. 3, a 50 Hz command is issued if the count applied from the counter 3 to the comparator 4 is 40 and a 60 Hz command is issued if the count is 33 Hz. As a result, the output of the semiconductor bridge circuit Tr1-Tr6 is an AC power having a frequency the same as that of the three-phase power U, V, W. Regeneration of the power supply is thus achieved.

When this power supply regenerating operation is carried out, the induced voltage of the induction motor M produced during deceleration is converted into direct current by the three-phase rectifier circuit including diodes D11-D16. The pulsating on/off power, controlled by the regenerative control circuit of transistors Tr1-Tr6, which is received from the smoothing capacitor via the limiting resistor R10, is regenerated in the three-phase power supply.

During on/off control performed by this regenerative control circuit, there is a rise in the voltage of regenerative power and an increase in current during an interruption, which is when there is a transition from on to off control. Since this can cause damage to the transistors of the control circuit, large transistors are required taking into consideration the regenerative power.

Accordingly, by improving upon the setting of the timing of on/off control performed by the regenerative control circuit, the efficiency of power regeneration may be improved with use of transistors of the same capacity. This is described below the next embodiment.

Figure 5:
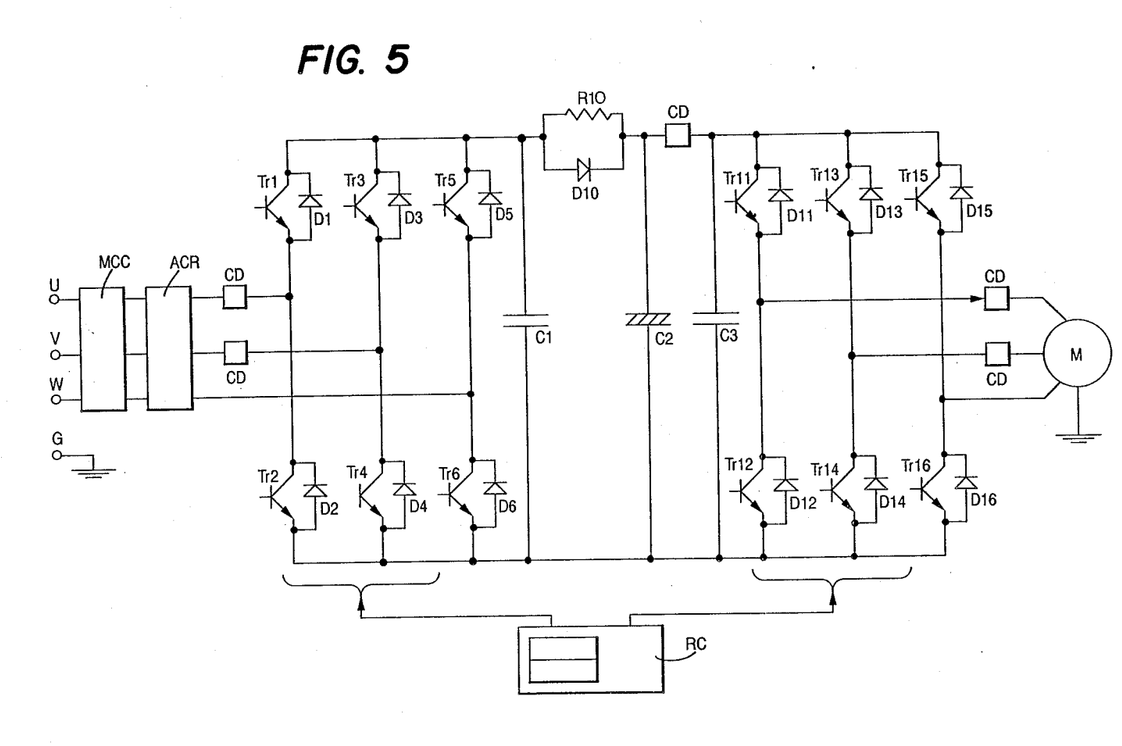
FIG. 5 is a circuit diagram illustrating a second embodiment according to the present invention.

FIG. 5 is a circuit diagram of a record embodiment of the present invention, and FIG. 6 is a waveform diagram for explaining regenerative power controlled by this embodiment. Portions similar to those shown in FIG. 1 are designated by like reference characters and a description thereof is omitted.

The circuit in FIG. 5 is arranged to increase the passed current by using a resistor having a resistance value lower than that of the resistor R1 shown in FIG. 1. The resistor R10 limits the current of regenerative power rectified and smoothed at the time of regenerative control.

The controller RC has a timing circuit which, when the induction motor M is driven issues a signal that controls the transistors Tr11-Tr16 to produce an AC power output having a voltage and frequency that will provide a driving force suited to the load. At the time of regenerative control, the timer circuit issued a control signal for controlling the transistors Tr1-Tr6 to perform on/off control at a timing that will provide excellent power supply regeneration efficiency. The controller RC also includes a limiter circuit for limiting excessive currents through the transistor Tr1-Tr6.

Figure 6A:
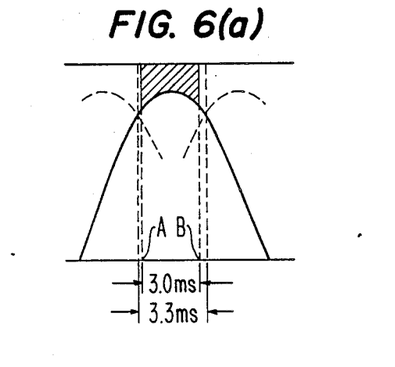
FIG. 6 is a waveform diagram for describing regenerative power controlled by the embodiment in FIG. 6.
Figure 6B:
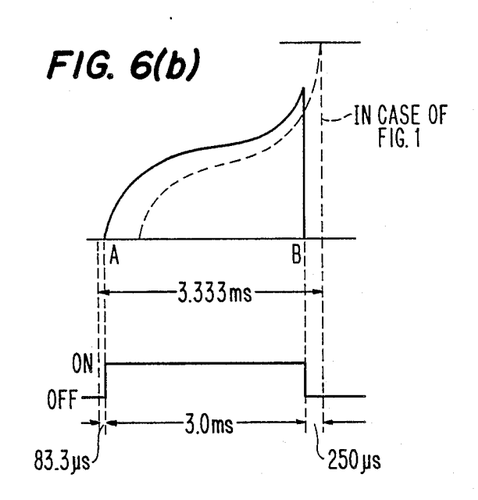
Figure 6C:
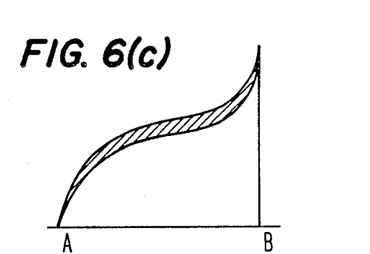

The power regenerating operation of this embodiment will now be described. The regenerative power of the induction motor M smoothed by the smoothing capacitor C2 is supplied to the regenerative control circuit including transistors Tr1-Tr6 via the resistor 10. At this time the controller RC provides the transistors Tr1-Tr6 with a control signal, shown in FIGS. 6(a) and (b), that turns on at point A and off at point B.

Here the point is one that is 83.3 μs beyond the starting point of the period of the cross points of identical voltages in each of the phases. The point B is one that is 3.0 ms beyond the point A, that is, a point 250 μs prior to the end point of the cross points. The setting of points A and B is performed by the timer circuit of the controller RC, with the cross points serving as a reference.

Consequently, as shown in FIG. 6(b), regenerative power begins to flow at point A and is interupted at point B. Though point A is near the starting point of the cross point and there is a potential difference from the DC line of the regenerative power, the load of the regenerative power has many inductance (L) components and, hence, there is no sharp rise in the current and no excessive current. Since the point B is far from the end point of the cross point, the potential difference from the DC line is not large and a current jump phenomenon is sufficiently suppressed within the limits of the transistors capacity even at current cut-off.

Further, since the jump phenomenon at current cut-off is suppressed, the resistance value is reduced and regenerative current is increased by the resistor R10. An increase in regenerative power can be obtained, as shown by the slanted-line portion in FIG. 6(c).

Figure 6D:
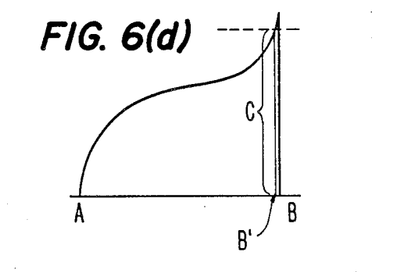

FIG. 6(d) illustrates the operation of the limiter circuit in the controller RC. This figure shows that if there is the danger of difficulties in the transistors due to a large jump phenomenon when the current is cut off at point B, excess capacity of the transistors can be prevented by controlling the current cut-off at a preset current point C.

With regard to control timing of the regenerative control circuit at the time of the regenerative operation of the induction motor in the present embodiment, ON control is set at 83.3 $\mu$s after the cross point and OFF control is set at 250 $\mu$s before the cross point by means of the timer circuit. The resistance value of the limiting resistor is decreased to increase the current supplied to the regenerative control circuit. This makes it possible to raise the efficiency of power regeneration and obtain an excellent regenerative braking effect with no change in the capacity of the regenerative control circuit transistors. Another advantage is that a rise in temperature due to heating of the limiting resistor is suppressed.

Furthermore, since the limiter circuit for current limiting is provided, excessive current is limited and transistor damage can be prevented.

Though three embodiments of the present invention have been described, the invention is not limited thereto and can be modified in a variety of ways with departing from the scope of the claims.

The power supply regenerating circuit of the present invention makes it possible to enhance the capability of regenerating power from an induction motor and improve regenerative braking efficiency in an induction motor drive circuit which performs motor drive control and regenerative control.

We claim:

1. A power supply regenerating circuit for driving an induction motor upon controlling AC frequency and voltage by an inverter after three-phase power is rectified and smoothed by a rectifying circuit, and for rectifying and smoothing induced electromotive force during deceleration of the induction motor and effecting a conversion into AC power by a semiconductor bridge circuit for performing power supply regeneration, said power supply regenerating circuit comprising:
   a parallel circuit including a reverse connected diode and a resistor connected between the rectifying circuit and the bridge circuit, the regenerative power blocked by said diode being supplied to the bridge circuit as a current limited by said resistor, and the regenerative power being supplied only during a predetermined interval of a three-phase period; and
   a power supply frequency discriminating circuit including:
      synchronizing signal generating means for generating signals upon successively detecting points at which an instantaneous value of voltage in one phase of a three-phase supply and an instantaneous value of voltage in a next phase of the three-phase power supply become equal;
      clock generating means for generating clock pulses;
      counting means, coupled to said synchronizing signal generating means, for counting clock pulses between signals from said synchronizing signal generating means;
      discriminating means, coupled to said counting means, for discriminating one of 50 Hz and 60 Hz in dependence upon a counted value in said counting means; and
      control means, coupled to said discriminating means and the bridge circuit, for controlling the bridge circuit by a signal from said discriminating means.

2. A power supply regenerating circuit according to claim 1, further comprising:
   timing means for measuring time from a cross point at which voltage values in two mutually adjacent phases of the three-phase power become equal;
   control means, coupled to said timing means, for on/off controlling the bridge circuit by said timing means; and
   means for mitigating current limiting of said resistor.

3. A power supply regenerating circuit according to claim 2, further comprising a limiter circuit for limiting excessive current during on/off control of the bridge circuit.

4. A power supply regenerating circuit according to claim 2, wherein the bridge circuit has an ON control point which is 83.3 $\mu$s after the cross point, and wherein said timing means sets an OFF control point 250 $\mu$s before the cross point 5. A power supply regenerating circuit for an induction motor having a three-phase power supply, comprising:
   a rectifying circuit, connected to the induction motor, for rectifying and smoothing electromotive force from the induction motor during deceleration;
   bridge means, connected to said rectifying circuit, for receiving the rectified and smoothed electromotive force and converting the rectified and smoothed electromotive force into AC power;
   diode means, connected between said rectifying circuit and said bridge means, for blocking current from said rectifying circuit during deceleration;
   resistor means, connected in parallel with said diode means, for limiting current to said bridge circuit during deceleration, said diode means and said resistor means performing power regeneration during deceleration; and
   a power supply frequency discriminating circuit, including;
      synchronizing signal generating means for generating signals upon successively detecting points at a time when an instantaneous value of voltage in one phase of the three-phase power supply and an instantaneous value of voltage in a next phase of the three-phase power supply become equal;

clock generating means for generating clock pulses;

counting means, connected to said synchronizing signal generating means and said clock generating means, for counting clock pulses between signals from said synchronizing signal generating means;

discriminating means, connected to said counting means, for discriminating between 50 Hz and 60 Hz in dependence upon a counted value from said counting means; and control means, connected to said discriminating means, for controlling the frequency of regeneration power in dependence upon a signal from said discriminating means.

* * * * *

UNITED STATES PATENT AND TRADEMARK OFFICE
CERTIFICATE OF CORRECTION

PATENT NO. : 4,928,052
DATED     : MAY 22, 1990
INVENTOR(S) : YOSHIKI FUJIOKA ET AL.

It is certified that error appears in the above-identified patent and that said Letters Patent is hereby corrected as shown below:

Col. 1, line 57, "circuit" should be --current--.

Col. 3, line 1, "present" should be --preset--;
     line 43, "which controlled" should be --which is controlled--.

Col. 4, line 37, "sequencly," should be --sequently,--;
     line 61, "Pl" should be --PL--.

Col. 6, line 2, change "33 Hz." to --33.--;
     line 30, "record embodiment" should be --second embodiment--;
     line 62, "point is" should be --point A is--.

Signed and Sealed this

Sixth Day of August, 1991

Attest:

HARRY F. MANBECK, JR.

*Attesting Officer*     *Commissioner of Patents and Trademarks*